US012434469B2

(12) United States Patent
Schiestl

(10) Patent No.: US 12,434,469 B2
(45) Date of Patent: Oct. 7, 2025

(54) PRINTING DEVICE

(71) Applicant: Angelo Schiestl, Langkampfen (AT)

(72) Inventor: Angelo Schiestl, Langkampfen (AT)

( * ) Notice: Subject to any disclaimer, the term of this patent is extended or adjusted under 35 U.S.C. 154(b) by 625 days.

(21) Appl. No.: 16/759,217

(22) PCT Filed: Oct. 11, 2018

(86) PCT No.: PCT/EP2018/077665
§ 371 (c)(1),
(2) Date: Apr. 24, 2020

(87) PCT Pub. No.: WO2019/081214
PCT Pub. Date: May 2, 2019

(65) Prior Publication Data

US 2021/0046749 A1 Feb. 18, 2021

(30) Foreign Application Priority Data

Oct. 25, 2017 (EP) .................................... 17198203

(51) Int. Cl.
*B41F 17/00* (2006.01)
*B41F 15/08* (2006.01)
(Continued)

(52) U.S. Cl.
CPC ........ *B41F 17/005* (2013.01); *B41F 15/0863* (2013.01); *B41F 15/18* (2013.01); *B41J 3/4078* (2013.01); *B41F 17/003* (2013.01)

(58) Field of Classification Search
None
See application file for complete search history.

(56) References Cited

U.S. PATENT DOCUMENTS 5,288,322 A * 2/1994 Hanna ................. B05B 13/0242 118/33
5,800,614 A 9/1998 Foust
(Continued)

FOREIGN PATENT DOCUMENTS

EP 1 857 287 A2 11/2007
EP 2 509 791 A1 10/2012
(Continued)

OTHER PUBLICATIONS

International Search Report issued in PCT/EP2018/077665; mailed Nov. 29, 2018.
(Continued)

*Primary Examiner* — Jill E Culler
(74) *Attorney, Agent, or Firm* — Studebaker Brackett PLLC

(57) ABSTRACT

The present invention relates to a printing device having a base body, at least one loading station, at least one printing station for printing a print substrate and at least one print substrate support for receiving the print substrate to be printed, wherein the print substrate support can be moved between the stations of the printing device, wherein the base body is configured with a conveyor means, by which the print substrate support can be delivered to the at least one printing station, wherein the conveyor means comprises at least one linear drive, which is configured to move the at least one print substrate support along the base body, wherein the base body is formed with at least one track, along which the print substrate support can be conveyed and wherein the print substrate support engages at least partially above and/or below the track, wherein means for carrying a load of the print substrate support are provided on the base body, into which means the print substrate support engages.

9 Claims, 2 Drawing Sheets

Figure 1:
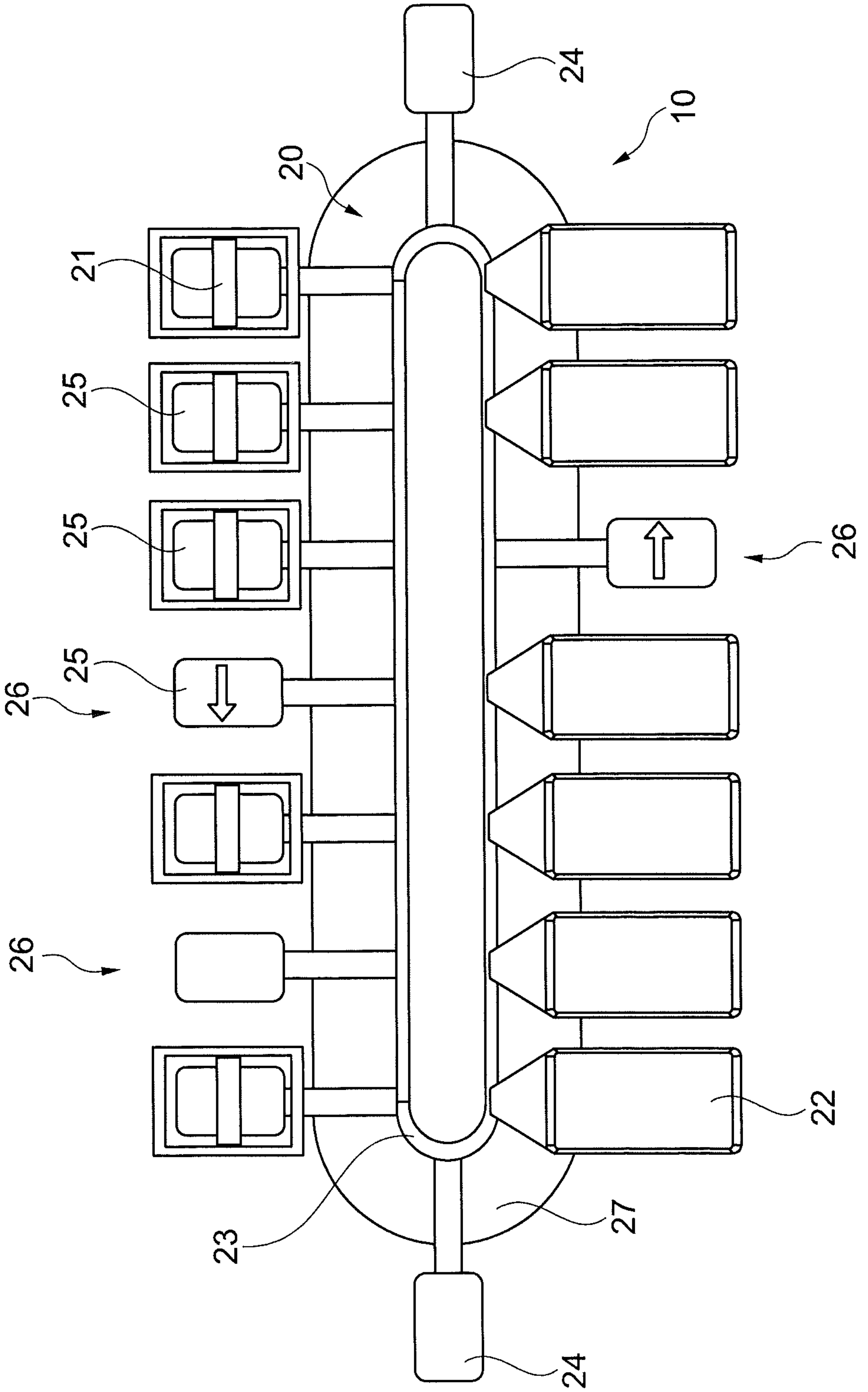

(51) Int. Cl.

| | |
|---|---|
| ***B41F 15/18*** | (2006.01) |
| ***B41J 3/407*** | (2006.01) |

(56) References Cited

U.S. PATENT DOCUMENTS

| | | | | |
|---|---|---|---|---|
| 6,230,876 | B1 * | 5/2001 | Gilberti | B25B 11/005<br>198/689.1 |
| 6,938,547 | B1 * | 9/2005 | Cecil | B41F 15/0863<br>101/124 |

FOREIGN PATENT DOCUMENTS

| | | | |
|---|---|---|---|
| EP | 2 509 791 | B1 | 10/2013 |
| WO | 2016/084056 | A1 | 6/2016 |
| WO | 2017/149347 | A1 | 9/2017 |

OTHER PUBLICATIONS

An Office Action mailed by China National Intellectual Property Administration on Mar. 24, 2021 which corresponds to Chinese Patent Application No. 201880069742.6 and is related to U.S. Appl. No. 16/759,217 with English language translation.

* cited by examiner

PRINTING DEVICE

The invention relates to a printing device according to the preamble of claim 1.

A printing device of this type is formed with a base body, at least one loading station, at least one printing station for printing a print substrate and at least one print substrate-support for receiving the print substrate to be printed, wherein the print substrate support can be moved between the stations of the printing device and wherein the base body is configured with a conveyor means, by which the print substrate support can be delivered to the at least one printing station.

It is known that printing devices of this type are configured with individual mechanical devices for moving the individual print substrate supports. This results in a high maintenance frequency for servicing the printing device. Furthermore, these devices suffer from inaccurate positioning of the print substrate supports in relation to the printing stations of the printing device as a result of the mechanical wear.

The object of the present invention is to provide a printing device that allows particularly low-maintenance operation.

The object is achieved by a printing device having the features of claim 1.

Preferred embodiments of the invention are specified in the respective dependent claims.

The printing device according to the invention is characterized in that the conveyor means comprises at least one linear drive, which is configured to move the at least one print substrate support along the base body, in that the base body is formed with at least one track along which the print substrate support can be conveyed, and in that the print substrate support engages at least partially above and/or below the track, wherein means for carrying a load of the print substrate support are provided on the base body, in which means the print substrate support engages.

A first basic concept behind the present invention consists in providing a conveyor means integrated in the printing device, which is configured to deliver the at least one print substrate support along a track to the individual stations, in particular at least one printing station, with low friction and preferably with no contact between track and print substrate support or between conveyor means and print substrate support. The conveyor means here is preferably configured as a linear drive, which permits particularly low-maintenance operation since it can work with particularly low friction and without lubricants. The print substrate is preferably configured as a textile.

According to the invention, a linear drive is preferably configured as an electromagnetic drive, which functions comparably with the drive of a magnetic levitation railway. A linear drive of this type can comprise at least one electrical coil and at least one magnet, preferably a permanent magnet, wherein a movement of the print substrate support relative to the base body of the printing device or relative to the track can be effected on the basis of a relative movement between the at least one electrical coil and the at least one magnet.

According to the present invention, the part of the conveyor means that is provided statically on the base body of the printing device (e.g. the at least one magnet or the at least one electrical coil) can be integrally connected to the base body of the printing device. The other part of the conveyor means is preferably provided on the print substrate support or a connecting piece thereof to the base body.

The track along which the print substrate support can be delivered to the individual stations of the printing device can be provided according to the invention above, below and/or at the side of the part of the conveyor means that is integrally connected to the printing device. The track here can form a surface or a region on the base body along which the print substrate support can be conveyed. The track is preferably configured in the manner of a housing and covers the conveyor means on at least one side relative to the print substrate support.

Although in principle it may be necessary for the base body of the printing device to be configured with means for carrying a load of the print substrate supports, this can however be accomplished independently of the conveyor means or the track. Preferably, the print substrate support engages in an appropriate device for carrying the loads in the base body. Alternatively, the base body can also engage in an appropriate receiver in the print substrate support for carrying a load of the print substrate support. In principle, the load of the print substrate support can lie adjacent to the base body independently of the track, as a result of which a contact-free drive between track and print substrate support can be provided.

According to a development of the invention, it is provided that in each case the at least one printing station comprises a screen printing station, a digital printing station or a combination thereof. In principle, any number of printing stations can be provided. Depending on the print substrate to be processed here, a combination of screen printing and digital printing can be employed to generate the desired print image, wherein the print substrate can be delivered to individual stations of the printing device to form a print image.

It is particularly preferred according to a development of the invention that the conveyor means is configured as an endless conveyor means. This can move the print substrate on the print substrate support backwards and forwards between the stations, for example, and/or along a perimeter of the base body.

An expedient development of the present invention consists in the fact that the at least one print substrate support has an upper guide roller and/or a lower guide roller, by which the print substrate support can be guided above and/or below the track. In principle, no direct contact between the print substrate support and the track is necessary for transporting the print substrate support along the track. The print substrate support can be at a distance from the track, comparably to a magnetic levitation railway. For an accurately positioned guidance of the print substrate support relative to the track, at least one of the above-mentioned rollers can in particular be provided on the print substrate support, the track or the base body of the printing device. If the at least one roller is provided on the print substrate support, this can be in rolling contact with the base body of the printing device and/or the track. Particularly preferably here, at least one upper guide roller and at least one lower guide roller on the respective print substrate support form a clamp along the track or part of the base body along the track.

According to a development of the present invention, it is provided that the linear drive has at least one electrical coil and at least one magnet, wherein a translation of the print substrate support along the endless conveyor means can be effected by a movement of the at least one electrical coil relative to the at least one magnet. The at least one print substrate support can be directly or indirectly connected to components of the linear drive.

It is particularly expedient according to a development of the invention that at least one magnet is provided on each of the at least one print substrate support(s). The print substrate support can thus move together with the magnet relative to the at least one electrical coil, as a result of which a displacement of the print substrate support relative to the base body, in particular along the base body or the track, can be effected.

It is particularly preferred according to a development of the invention that at least one electrical coil is provided on each of the at least one print substrate support(s). In principle, the present invention is not limited to the magnet's being arranged on a print substrate support. Rather, it is also possible for the print substrate support to comprise the at least one electrical coil, in which case the at least one magnet can be arranged on the base body of the printing device. In this case the magnet is provided statically on the printing device, whereas the electrical coil moves with the print substrate support relative to the magnet. This can in particular have the advantage that when a maintenance operation takes place on the at least one electrical coil on the print substrate support, said print substrate support can be removed from the printing device and the printing device can continue to be operated with the other print substrate supports that are provided. This is intended to illustrate the fact that the present invention is not limited to the structurally preferred variant, with the magnet on the print substrate support, representing the only possible variant.

The magnet is preferably a permanent magnet, but an electromagnet can also be provided. Should the electrical coil be provided on the base body, this can be supplied with electrical energy by way of at least one electric line. On the other hand, should the electrical coil be provided on the print substrate support, for example a rechargeable battery, which supplies the electrical coil with electrical energy, can be arranged on the print substrate support. In this case, means can be provided on the individual stations of the printing device to charge the rechargeable battery. Alternatively, by way of e.g. a sliding contact, the electrical coil on the print substrate support can be permanently supplied with electrical energy. The sliding contact in this case can be configured at least partially parallel to the track.

According to a preferred development of the present invention, it is provided that at least two loading stations are provided, which are preferably arranged on opposite sides of the base body, the individual printing stations being provided between the loading stations.

The base body or the track is preferably circular or oval in configuration, with the individual print substrate supports being movable cyclically, in particular in uniform endless tracks, or in an alternating manner, i.e. in the form of a reciprocating movement, along the conveyor means or track. The at least two loading stations are preferably arranged on opposite sides of the printing device. As a result, in the case of two loading stations, for example, two regions can be formed, which are separated from each other by the two loading stations. In a first one of the two regions, for example the at least one screen printing station and in the second region the at least one digital printing station can be provided. Alternatively, any combinations, for example equal combinations, of screen printing stations and digital printing stations can also be arranged in the respective regions. In principle, exclusively at least one screen printing station or at least one digital printing station can also be provided on the printing device.

It is particularly expedient according to a development of the invention that the at least one printing station is releasably connected to the base body of the printing apparatus and is interchangeable as desired. In principle, the various stations can be arranged along the base body and combined as desired. Accordingly, it can be expedient that a plurality of digital printing stations and/or screen printing stations can be provided on the base body and/or printing stations are added or removed.

According to a particularly advantageous development of the present invention, it is provided that the printing device has a control unit, by which the at least one print substrate support can be accurately moved and positioned relative to the at least one printing station. With regard in particular to a particularly accurately positioned printing of a print substrate by the individual printing device, it is necessary that the print substrate support can be positioned precisely relative to the printing stations. In a multi-layer print, in which individual parts of a print image are provided in succession on the textile by different printing stations, even the slightest deviations can lead to considerable defects in the appearance of the overall print image.

Preferably, a plurality of coils is arranged along the annular, in particular oval-shaped, track. By targeted control of the coils by the control unit, the individual print substrate supports can be moved in a targeted manner. The individual print substrate supports preferably have an identifier, so that their position along the track can be interrogated and determined by the control unit with or without contact. On the individual stations, in particular the printing stations, a mechanical locking or positioning apparatus can be provided, with which the print substrate support can additionally be positioned and fixed.

With regard, in particular to a traditional, mechanical movability of the print substrate supports using drive pinions, drive wheels or similar, the use of a linear drive allows a constantly particularly accurate positioning of the print substrate supports relative to and in the printing stations.

The invention is explained in more detail below in the drawing. The FIGURE shows the following:

FIG. 1: a schematic top view of an embodiment of the printing device according to the invention.

Figure 2:
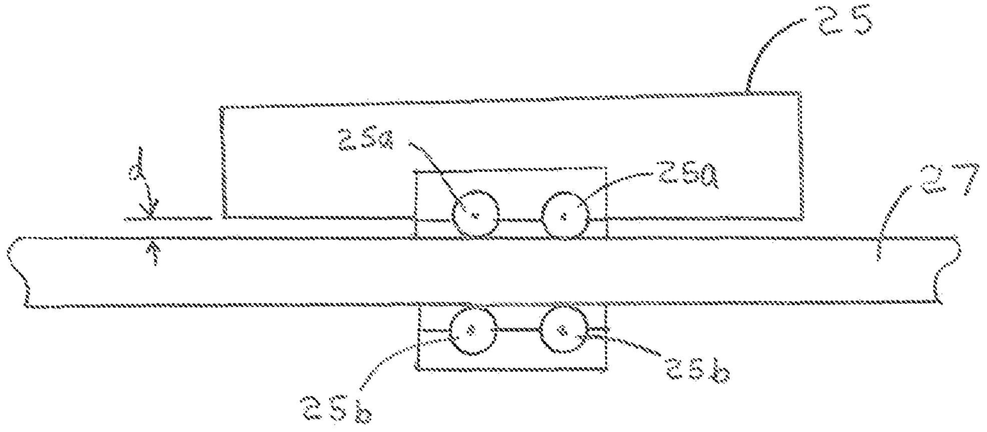

FIG. 2: a schematic partial side view of an embodiment of the printing device according to the invention.

FIG. 1 shows a schematic top view of the printing device 10 according to the invention. The printing device 10 comprises a base body 20 on which at least one screen printing station 21 and/or at least one digital printing station 22, i.e. a printing station, is arranged. These are arranged along a perimeter region 23 of the base body 20. The printing device 10 comprises at least one loading station 24, in which a print substrate support 25 can be equipped with a textile. On the base body 20 of the printing device 10 a track 27 is configured, above which the print substrate support 25 can be moved along the perimeter region 23. In the perimeter region 23, means are arranged for carrying a load of the print substrate support 25. For the load of the print substrate supports 25, a receiver for the print substrate support 25 can be provided on the base body 20. Alternatively or in addition, a receiver can be configured on the print substrate support 25, in which at least part of the base body 20, preferably of the perimeter region 23, engages in the print substrate support 25. The circumferential track 27 is oval-shaped with two parallel straight regions, in which the stations 21, 22 are arranged, and two semicircular turning regions.

In the track 27, preferably below a surface of the track 27, the static part of a linear drive for the print substrate supports 25 can be arranged. In particular, this can be an electrical coil or magnet arrangement. The movable part of the linear drive is preferably provided in the at least one print substrate support 25. By movement of the movable part relative to the static part of the linear drive, the at least one print substrate support 25 can be delivered to the individual printing stations 21, 22 along the perimeter region 23. In principle, the movable part can be the part that is provided in the print substrate support 25 and the static part the part of the linear drive that is provided in the base body 20, below the track 27 and/or within the track 27. Between the static part of the linear drive and the print substrate support, a protective surface can be arranged, which can form the track 27.

On the base body 20, the perimeter region 23, the track 27 and/or the at least one print substrate support 25, at least one roller can be provided, which permits an accurately positioned alignment of the print substrate supports relative to the track or the static part of the linear drive and ultimately relative to the printing stations. Preferably, the print substrate support can be guided relative to the track in a contact-free manner, comparably to a magnetic levitation railway. Referring now to FIG. 2, in an embodiment the at least one print substrate support 25 comprises an upper guide roller 25*a* and a lower guide roller 25*b*, by means of which the print substrate support 25 is guided above or below the track 27 at a distance d from the track 27 without contacting the track 27.

According to FIG. 1, screen printing stations 21 are arranged in a first region and digital printing station 22 in a second region, the two regions being separated by two loading stations 24 arranged opposite each other. In principle, any number of loading stations 24 and printing stations 21, 22 can be provided. The arrangement of screen printing stations 21 and digital printing stations 22 can also be provided alternately and/or in blocks along the peripheral region 23 of the base body 20.

In principle, just one individual printing station can be provided on the printing device.

The printing stations can preferably be provided releasably on the base body 20 of the printing device 10, allowing a rapid and flexible adaptation of the printing device to a motif to be printed on the textile.

The at least one print substrate support 25 is mounted such that it can be moved along the base body 20, preferably along the perimeter region 23, using a linear drive. For this purpose, the at least one electrical coil and a magnet are provided, wherein a translational movement of the magnet relative to the electrical coil can be generated by appropriate control of the coil. By appropriate control of the electrical coil by a control unit, the at least one print substrate support 25 can be accurately positioned relative to the printing stations 21, 22.

A print substrate, in particular a textile, arranged on the print substrate support 25 can thus pass through at least one of the printing stations 21, 22, the print substrate being provided in individual printing stations 21, 22 with a partial print image or an entire print image in each case.

In principle, the print substrate support is also configured to skip individual printing stations 21, 22, as a result of which the print substrate on the print substrate support 25 is only delivered to the printing stations 21, 22 that are necessary for the print image to be produced.

When the textile or print substrate has been readily printed, it can be removed at the one or at one of the multiple loading stations 24, freeing up the print substrate support 25 for a further textile.

Between the individual printing stations, further processing stations 26 can be provided, in which e.g. an orientation or a pretreatment of the textile can be performed before further printing.

In principle, a pretreatment, drying or other processing station for print substrates, in particular for textile print substrates, can be provided instead of one or more of the printing stations.

In principle, the base body 20 of the printing apparatus 10 can be configured in a segmented fashion, enabling the size of at least the peripheral region 23 to be adapted to the number of printing stations or loading stations, and to be extended.

The invention claimed is:

1. Printing device for printing textiles, having
a base body,
at least one loading station,
at least one printing station for printing a textile as a print substrate and
at least one print substrate support for receiving the print substrate to be printed, wherein the print substrate support can be moved between the stations of the printing device, wherein the base body is configured with a conveyor means by means of which the print substrate support can be delivered to the at least one printing station,
characterized in that
the print substrate support is configured to support a textile for printing,
the conveyor means comprises at least one electromagnetic linear drive, which is configured to move the at least one print substrate support along the base body,
the base body has at least one track, along which the print substrate support can be conveyed,
the print substrate support engages above or below the track, wherein means for receiving a load of the print substrate support are provided on the base body, in which means the print substrate support engages,
the at least one print substrate support comprises an upper guide roller and a lower guide roller, by means of which the print substrate support is guided above or below the track at a predetermined distance from the track without contacting the track as the at least one electromagnetic linear drive moves the at least one print substrate support, and
the at least one printing station is releasably connected to the base body of the printing device and can be exchanged as desired.

2. Printing device according to claim 1,
characterized in that
the at least one printing station comprises a screen printing station, a digital printing station or a combination thereof.

3. Printing device according to claim 1,
characterized in that
the conveyor means is configured as an endless conveyor means.

4. Printing device according to claim 1,
characterized in that
the linear drive comprises at least one electrical coil and at least one magnet, wherein a translation of the print substrate support along the conveyor means can be effected by a movement of the at least one electrical coil relative to the at least one magnet.

5. Printing device according to claim 1,
characterized in that
at least one magnet is provided on each of the at least one print substrate support(s).

6. Printing device according to claim 1,
characterized in that at least one electrical coil is provided on each of the at least one print substrate support.

7. Printing device according to claim 1,
characterized in that
at least two loading stations are provided, which are preferably arranged on opposite sides of the base body, the individual printing stations being provided between the loading stations.

8. Printing device according to claim 1,
characterized in that
a plurality of printing stations can be provided on the base body.

9. Printing device according to claim 1,
characterized in that
the printing device comprises a control unit, by which the at least one print substrate support can be accurately moved and positioned relative to the at least one printing station.

* * * * *